United States Patent
Casgrain

(10) Patent No.: US 10,486,747 B2
(45) Date of Patent: Nov. 26, 2019

(54) MOTORIZED VEHICLE WITH PIVOTING CABIN COMBINING FEATURES OF AUTOMOBILES AND MOTORCYCLES

(71) Applicant: KARV A/M DESIGN, Sherbrooke (CA)

(72) Inventor: Dominic Casgrain, Sherbrooke (CA)

(*) Notice: Subject to any disclaimer, the term of this patent is extended or adjusted under 35 U.S.C. 154(b) by 0 days.

(21) Appl. No.: 15/548,845

(22) PCT Filed: Feb. 12, 2016

(86) PCT No.: PCT/CA2016/050130
§ 371 (c)(1),
(2) Date: Aug. 4, 2017

(87) PCT Pub. No.: WO2016/127261
PCT Pub. Date: Aug. 18, 2016

(65) Prior Publication Data
US 2018/0015954 A1    Jan. 18, 2018

(30) Foreign Application Priority Data
Feb. 12, 2015 (GB) .................... 1502352.6

(51) Int. Cl.
*B62D 21/18* (2006.01)
*B60K 7/00* (2006.01)
(Continued)

(52) U.S. Cl.
CPC .......... *B62D 21/183* (2013.01); *B60K 7/0007* (2013.01); *B62D 5/0403* (2013.01);
(Continued)

(58) Field of Classification Search
CPC . B62D 33/063; B62D 33/0636; B62D 33/067
See application file for complete search history.

(56) References Cited

U.S. PATENT DOCUMENTS

| 2,116,027 | A | | 5/1938 | Kolbe |
| 5,116,069 | A | * | 5/1992 | Miller ............... B60G 3/14 180/210 |

(Continued)

FOREIGN PATENT DOCUMENTS

| DE | 2553960 A1 | 6/1977 |
| DE | 102012107154 | 2/2014 |

(Continued)

OTHER PUBLICATIONS

ISR and WO—PCT/CA2016/050130.
EP16748522.6—European Search Report.

*Primary Examiner* — James A Shriver, II
*Assistant Examiner* — James J Triggs
(74) *Attorney, Agent, or Firm* — Lavery de Billy; Gonzalo Lavin

(57) ABSTRACT

A vehicle including a base frame having three or more wheels; a steering system for steering one or more of the wheels; a propulsion system for driving at least one of the wheels; a front pivot member and a back pivot member longitudinally spaced apart from one another on the base frame; a cabin having a front pivot point and a back pivot point, the cabin being pivotally mounted to the base frame between the front pivot member and the back pivot member, the front and back pivot points defining a longitudinal rotational axis of the cabin that is above a center of gravity of the cabin, the cabin being rotatable around the longitudinal rotational axis in one of a clockwise or a counterclockwise direction; and a seat assembly in the cabin for sitting one or more users, the seat assembly being located below the rotational axis of the cabin.

22 Claims, 8 Drawing Sheets

(51) Int. Cl.
  *B62D 5/04* (2006.01)
  *B62D 27/04* (2006.01)
  *B62D 24/04* (2006.01)
  *B62D 31/00* (2006.01)

(52) U.S. Cl.
  CPC ............ *B62D 24/04* (2013.01); *B62D 27/04* (2013.01); *B62D 31/003* (2013.01)

(56) References Cited

U.S. PATENT DOCUMENTS

| | | | | |
|---|---|---|---|---|
| 6,435,522 | B1* | 8/2002 | Van Den Brink | B62D 9/02 |
| | | | | 180/210 |
| 7,591,337 | B2* | 9/2009 | Suhre | B60G 3/20 |
| | | | | 180/210 |
| 7,607,695 | B2* | 10/2009 | Moulene | B60G 21/007 |
| | | | | 280/5.507 |
| 7,722,063 | B2 | 5/2010 | Dieziger | |
| 7,931,286 | B2* | 4/2011 | Melcher | B60G 7/006 |
| | | | | 280/124.103 |
| 7,946,371 | B1* | 5/2011 | Cichon | B62M 27/02 |
| | | | | 180/190 |
| 2002/0089133 | A1 | 7/2002 | Dempster | |
| 2008/0100018 | A1 | 5/2008 | Dieziger | |
| 2010/0320023 | A1 | 12/2010 | Rhodig | |
| 2013/0062133 | A1* | 3/2013 | Budweil | B60B 35/1063 |
| | | | | 180/209 |
| 2013/0153311 | A1* | 6/2013 | Huntzinger | B60G 3/08 |
| | | | | 180/55 |
| 2014/0312644 | A1* | 10/2014 | Srabstein | B62J 17/08 |
| | | | | 296/89 |

FOREIGN PATENT DOCUMENTS

| | | |
|---|---|---|
| EP | 1987982 | 11/2008 |
| FR | 29469441 A | 12/2010 |
| WO | WO 2004/043769 | 5/2004 |
| WO | WO2004043769 A1 | 5/2004 |
| WO | WO 2010/001397 | 1/2010 |

\* cited by examiner

MOTORIZED VEHICLE WITH PIVOTING CABIN COMBINING FEATURES OF AUTOMOBILES AND MOTORCYCLES

CROSS-REFERENCE TO RELATED APPLICATIONS

This application is a National Entry Application of PCT application no. PCT/CA2016/050130 filed on Feb. 12, 2016 and published in English under PCT Article 21(2), which claims priority to GB Patent application no. 1502352.6 filed on Feb. 12, 2015. All documents above are incorporated herein in their entirety by reference.

FIELD OF THE INVENTION

The present invention relates to motorized vehicles and, more specifically, to a vehicle that combines characteristics of motorcycles, in terms of handling/steering, with the stability and safety of a regular car.

BACKGROUND OF THE INVENTION

Presently, it is well known that in the field of vehicles a substantial diversification of models has been proposed.

In the field of regular cars, it is known of crossover vehicles that are built on a car platform and combine the features of sports utility vehicles (SUV). However, there are no known regular cars in the current market that combine the stability and safety of a regular car with handling/steering characteristics of a motorcycle.

In the field of smaller vehicles such as ATV (All Terrain Vehicle), there is a growing interest towards "hybrid" vehicles that combine the characteristics of motorcycles, in terms of handling, with the stability of four-wheeled vehicles. Such vehicles are, for example, represented by four-wheeled vehicles known commercially by the name quad. There also exist similar three-wheeled vehicles. These may have two wheels in front and one at the rear or alternatively one in the front and two in the rear.

A problem with regular cars or most known three-wheeled vehicles or four-wheeled vehicles is the inability to provide the rider with a feeling akin to that of riding a motorcycle in a comfortable and natural way.

US 2010/0320023 (RHODIG) discloses a four wheeled hybrid vehicle that allegedly provides the feeling of riding a motorcycle. Such vehicle has a rotational section coupled to a frame and a steering assembly with a flexible joint that adjusts the steering assembly as the rotational section rotates. However, the saddle where the rider sits is located above the axis of rotation of the rotational section, which, in use, provides an awkward and unbalanced perception of its position by the rider. Indeed, even though the combined center of gravity of the rider, saddle and rotational section is below the axis of rotation of the rotational section, such axis of rotation is also below the saddle, which makes for an uncomfortable and unstable ride for the rider.

US 2008/0100018 (DIEZIGER); U.S. Pat. No. 7,722,063 (DIEZIGER); DE 10 2012 107 154 (KRAMMEL); FR 2 946 944 (LEHONGRE et al.) disclose three or more wheeled vehicles, which vehicles tilt from the vertical plane during operation in a manner like that of a motorcycle. However, the axis of rotation of the cabin or seat is also below the rider's seat, which makes for an uncomfortable and unstable ride.

U.S. Pat. No. 7,946,371 (CICHON) discloses a snowmobile, which tilts from the vertical plane during operation in a manner like that of a motorcycle. However, the axis of rotation of the cabin is also below the rider's seat, which makes for an uncomfortable and unstable ride.

There is therefore a need for a vehicle that provides a feeling akin to that of riding a motorcycle, combined with a more comfortable natural reaction during a ride, that feels safer and more stable compared to that of existing hybrid vehicles.

There is also a need for a vehicle that provides a feeling akin to that of riding a motorcycle and that combines characteristics of a regular car in terms of comfort and safety.

SUMMARY OF THE INVENTION

In accordance with a present embodiment of the present invention there is provided a vehicle comprising: a base frame having three or more wheels; a steering system for steering one or more of the wheels; a propulsion system for driving at least one of the wheels; a front pivot member and a back pivot member longitudinally spaced apart from one another on the base frame; a cabin having a front pivot point and a back pivot point, the cabin being pivotally mounted to the base frame between the front pivot member and the back pivot member, the front and back pivot points defining a longitudinal rotational axis of the cabin that is above a center of gravity of the cabin, the cabin being rotatable around the longitudinal rotational axis in one of a clockwise or a counterclockwise direction; and a seat assembly in the cabin for sitting one or more users, the seat assembly being located below the longitudinal rotational axis of the cabin.

A preferred advantage of the present invention is that it provides a vehicle with a ride that is akin to that of riding a motorcycle with more natural movements, and that is more comfortable and more stable as compared to existing hybrid vehicles.

Another preferred advantage of the present invention is that it provides a vehicle with characteristics of a regular car in terms of comfort and safety and combines it with a ride that is akin to that of riding a motorcycle.

DESCRIPTION OF THE ILLUSTRATIVE EMBODIMENTS

Figure 1:
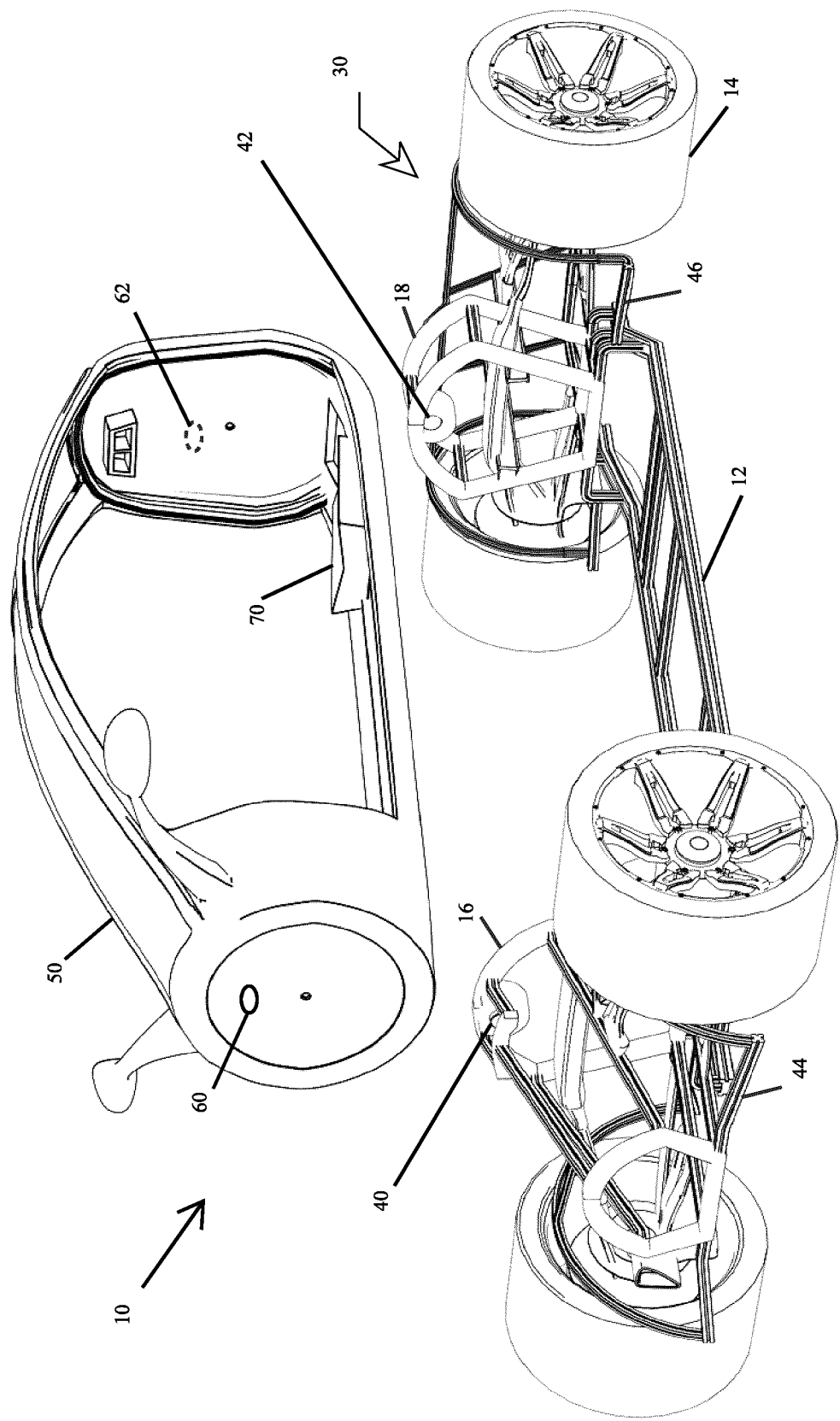
FIG. 1 is a perspective exploded view of parts of a vehicle, in accordance with an illustrative embodiment of the present invention.
Figure 2:
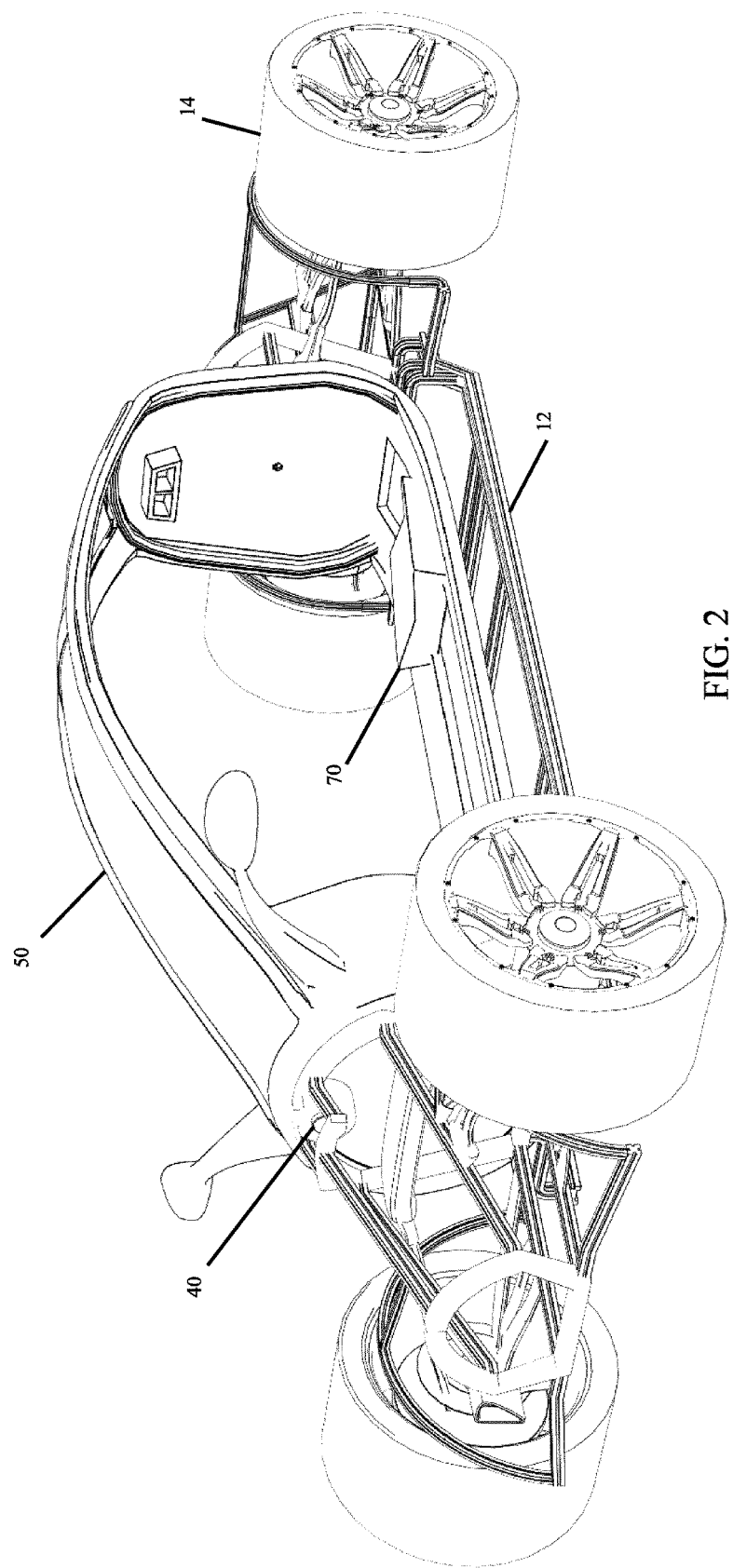
FIG. 2 is a perspective view of the assembled parts of the vehicle of FIG. 1, in accordance with an illustrative embodiment of the present invention.

The present invention is illustrated in further detail by the following non-limiting examples.

Referring now to FIGS. 1 to 9, and in accordance with illustrative embodiments of the present invention, a vehicle 10 is shown. The vehicle 10 is a four wheeled vehicle that provides a feeling akin of that of riding a motorcycle. The vehicle 10 has a cabin 50 that axially rotates while the vehicle 10 is turning, similar to what one can do when riding a motorcycle. This is accomplished by virtue of the pendulum effect of the weight of the cabin 50 when subjected to the forces of the turning vehicle 10. In other words, when the vehicle 10 turns the centrifugal forces on the cabin 50 make it pivot along a substantially horizontal axis.

In another alternative embodiment, the vehicle 10 may have only three wheels, that is to say two back wheels and one front wheel, or two front wheels and one back wheel.

In another alternative embodiment, the vehicle 10 may have different ground engaging devices in lieu of the wheels 14, such as stakes or tracks of snowmobiles.

Referring back to FIG. 1, the vehicle 10 has a base frame 12 onto which are mounted four wheels 14. The base frame 12 is substantially rigid and moves relatively little with respect to the ground and is similar to any other standard car frame in that respect. The base frame 12 has a pair of opposing support brackets 16, 18 that define a space for receiving the cabin compartment 50. In accordance with one embodiment, the front support bracket 16 has a front pivot member 40 and the back support bracket 18 has a back pivot member 42. The front pivot member 40 and the back pivot member 42 are longitudinally spaced apart from one another on the base frame 12. The support brackets 16, 18 are made of rounded struts forming a pentagonal shape, with the top portion forming an arc where the pivot members 40, 42 are mounted. However, this shape of the support brackets 16, 18 is only provided as an example and many other shapes may be used to achieve the same results.

In a preferred embodiment, the base frame 12 includes a rear compartment located adjacent to the two back wheels. The rear compartment may receive a combustion motor and/or an electric motor. The rear compartment can also receive a battery pack that drives the back wheels. Of course, many different configurations may be embodied. Indeed, the combustion motor and/or electric motor may drive the front wheels or the back wheels or all the wheels. The location of the motors may be also modified.

In a preferred embodiment, the base frame 12 includes a front compartment located adjacent to the two front wheels for providing storage space to the user of the vehicle 10. Of course, many other different configurations may be embodied. For example, the front compartment may receive electric and/or combustion motors.

Figure 3:
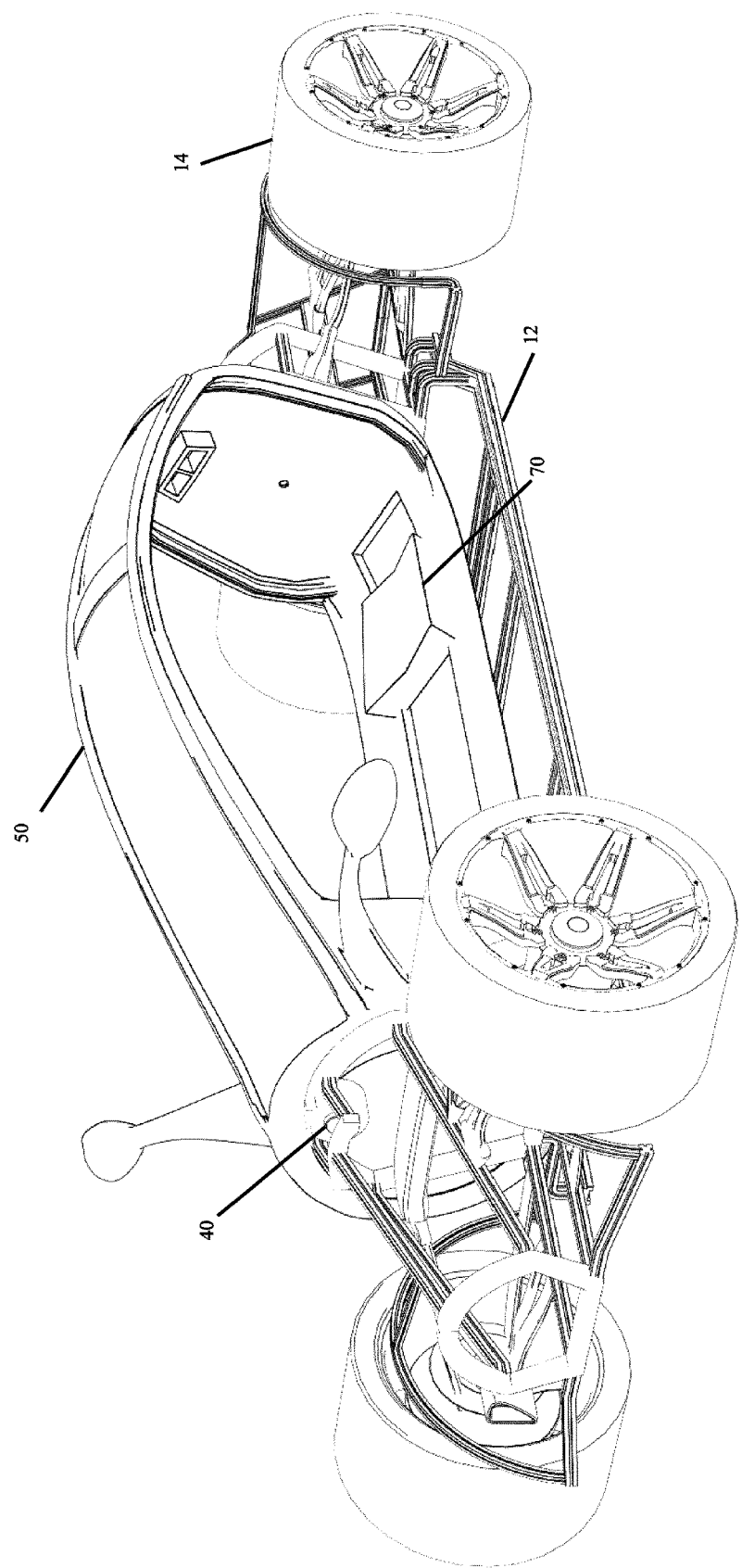
FIG. 3 is a perspective view of the vehicle of FIG. 1 in a tilted clockwise position.
Figure 4:
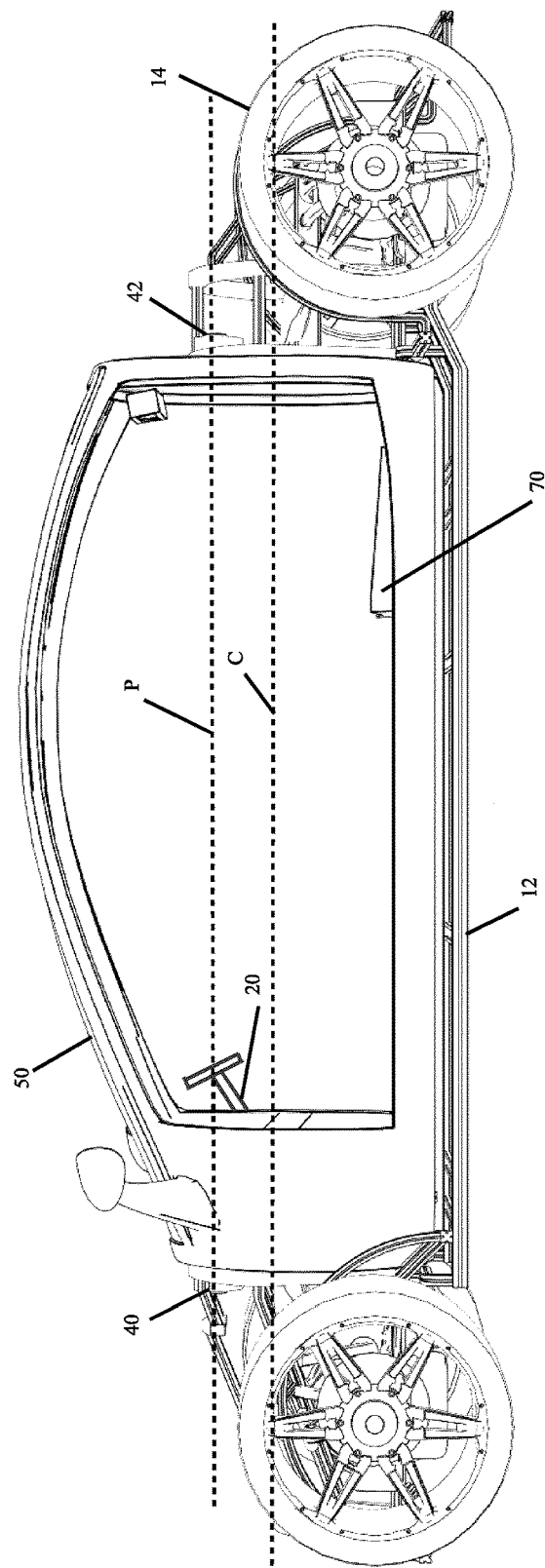
FIG. 4 is a side view of the vehicle of FIG. 1.
Figure 6:
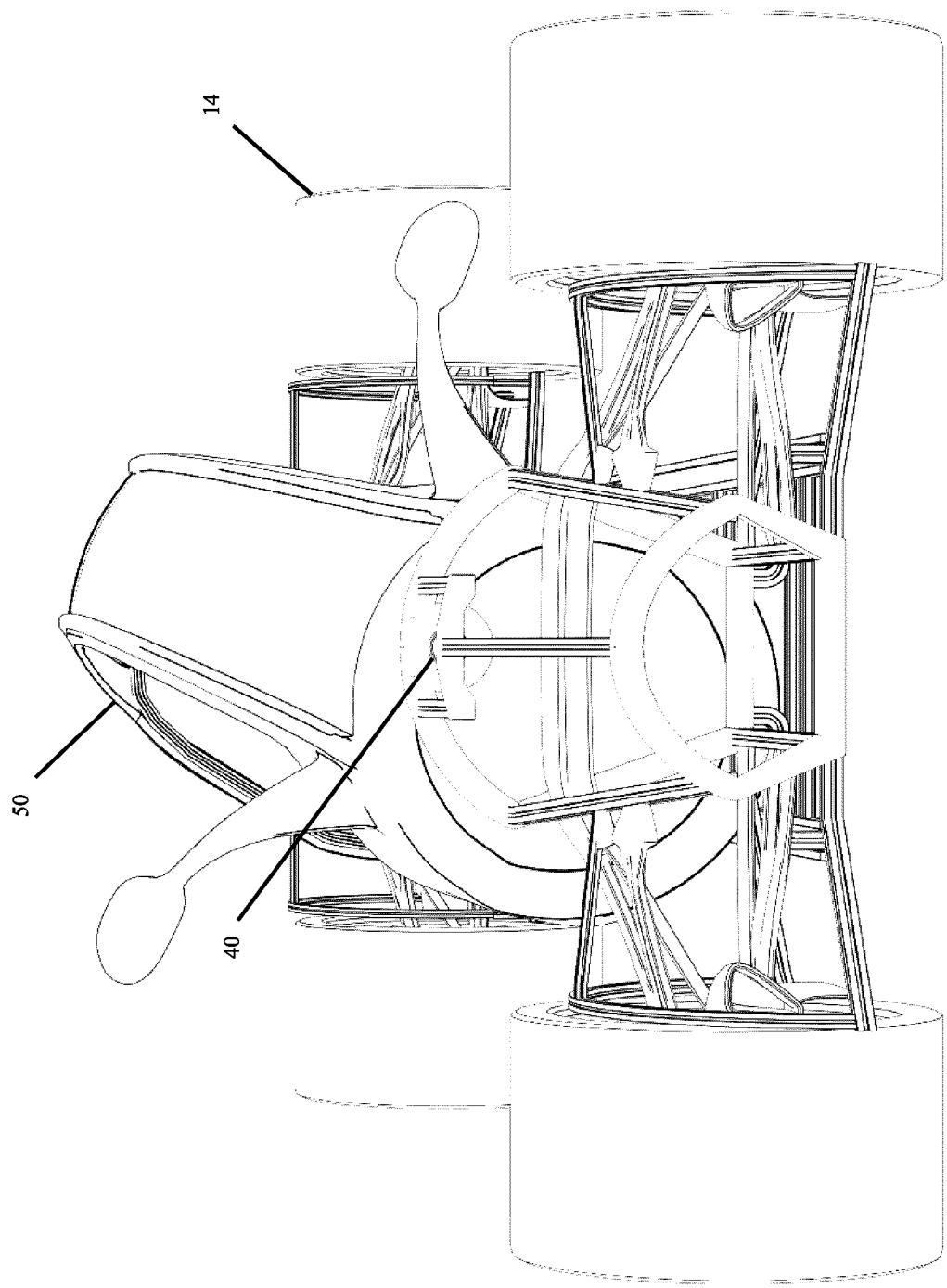
FIG. 6 is a front view of the vehicle of FIG. 1 in a tilted clockwise position.
Figure 7:
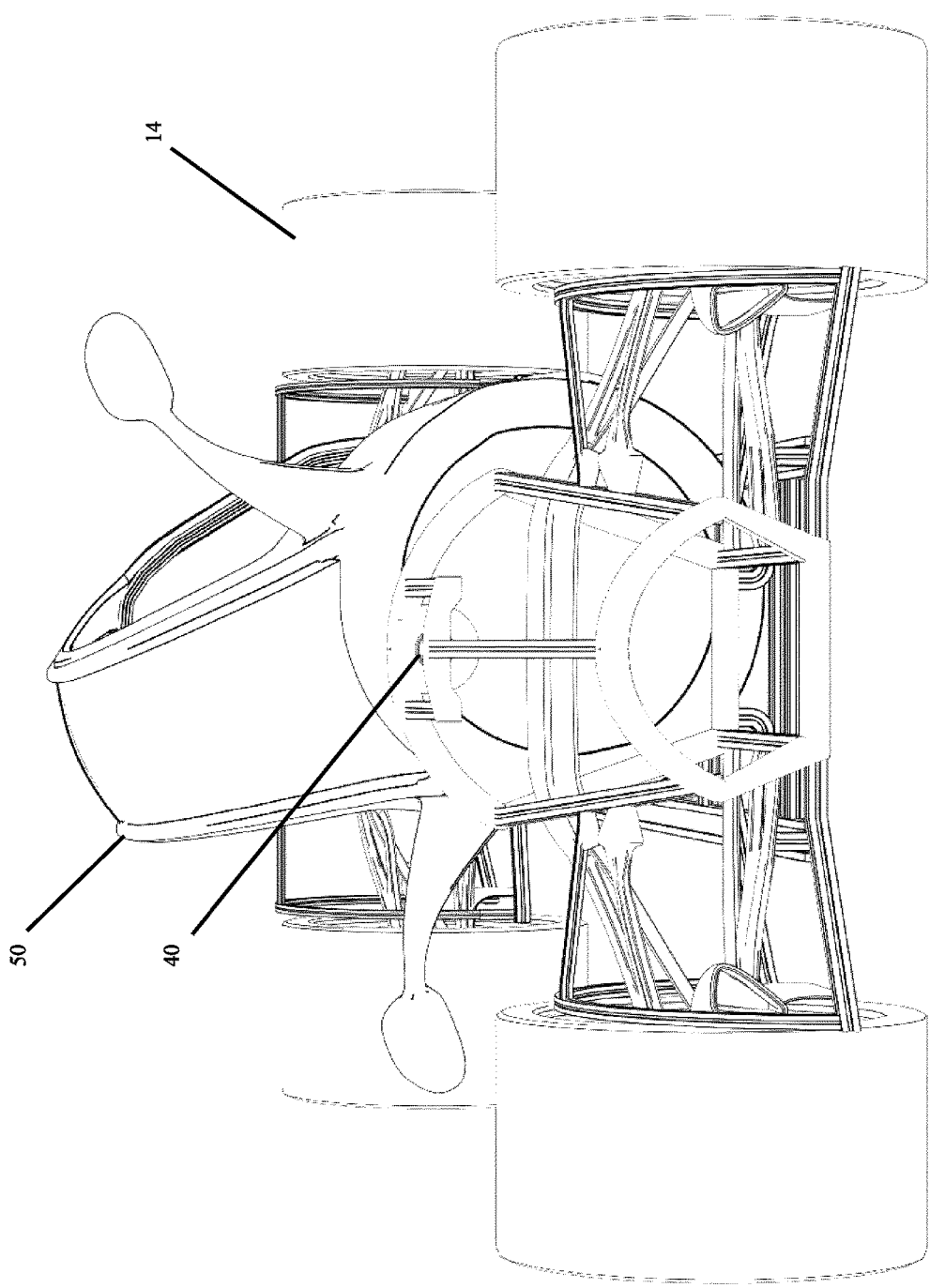
FIG. 7 is a front view of the vehicle of FIG. 1 in a tilted counter clockwise position.

Referring back to FIGS. 1 and 4, the cabin compartment 50 has a front pivot point 60 and a back pivot point 62. As shown in FIG. 4, the cabin 50 is pivotally mounted to the base frame 12 between the front pivot member 40 and the back pivot member 42 that define a longitudinal axis P which is substantially horizontal with respect to the ground. The cabin 50 is therefore coupled to and positioned between the pair of support brackets 16, 18 so as to rotate with respect to the base frame 12. This allows the rider to feel a swiveling while turning the vehicle 10 similar to what one can feel when riding a motorcycle. As shown in FIGS. 3, 6 and 7, the cabin 50 rotates in a clockwise or counterclockwise direction as a rider turns the vehicle 10 towards the left or right due to the centrifugal forces. The riders feel the cabin 50 pivoting in a relatively passive manner.

In accordance with one embodiment, the cabin 50 is pivotally mounted to freely rotate with respect to front and back pivot member 40, 42 of the base frame 12. However, the cabin 50 may be limited to rotate no more that approximately + or −45° in a clockwise or counterclockwise direction. Different ranges of maximum rotation of the cabin 50 may be set as person skilled in the art will understand.

In another embodiment, the vehicle 10 may be provided with a safety control system that limits the speed and/or acceleration of the rotation of the cabin 50. This control system may be preset and may be modified by the rider during use depending on his/her preferences.

Referring back to FIG. 4, the front and back pivot points 60, 62, which are mounted on the respective front and back pivot members 40, 42, define the longitudinal rotational axis P of the cabin 50 that is above a center of gravity C of the cabin 50. As explained above, the cabin 50 is rotatable around the longitudinal rotational axis P in one of a clockwise or a counterclockwise direction. A seat assembly 70 in the cabin 50 for sitting one or more riders or users is located below the longitudinal rotational axis P of the cabin 50. This configuration of the rotational axis P with respect to the seat assembly 70 has the advantage of providing the rider with a more stable, natural and comfortable rotation perception as compared to existing hybrid vehicles.

The seat assembly 70 may be adjustably slid on the floor of the cabin compartment 50. The seat assembly 70 and cabin 50 may be shaped and sized to receive two or more riders sitting one on front of the other.

In an embodiment, the vehicle 10 is provided with a suspension system, such as a front suspension 44 and rear suspension 46 coupled respectively to the front and back axles of the wheels 14. Different types of suspension systems may be used. In an embodiment, the front suspension 44 and the rear suspension 46 may be dependent or independent suspensions. In the embodiment shown, the front suspension 44 and the rear suspension 46 are independent suspensions. Thus the wheels 14 are allowed to move independently from one another. Furthermore, a straight axle or a split-axle design may be used. The split-axle design allows for independent suspension of the left and right wheels. A split-axle further permits the use of a differential, allowing the left and right drive wheels to be driven at different speeds, improving traction and extending tire life.

Referring back to FIG. 4, the vehicle 10 has an electronic steering system 20. Different types of electronic steering systems may be used. Preferably, in order not to interfere with the free rotation of the cabin 50, the steering system 20 includes a steering portion inside the cabin 50 that controls another steering component that is operatively connected to the one or more wheels 14. Of course, the steering portion and the steering component may be connected via electrical wires or wirelessly in a way that achieves the same result. The steering system may also be mechanical.

Referring back to FIG. 1, the vehicle 10 has a propulsion system 30 for driving one or more of the wheels 14. The propulsion system may include an electric motor system and/or a combustion motor. In an embodiment, the propulsion system may include a wheel-mounted electric motor of the type disclosed in U.S. Pat. No. 5,327,034 (COUTURE et al.), which was granted to Hydro-Quebec on May 2, 1995.

Figure 5:
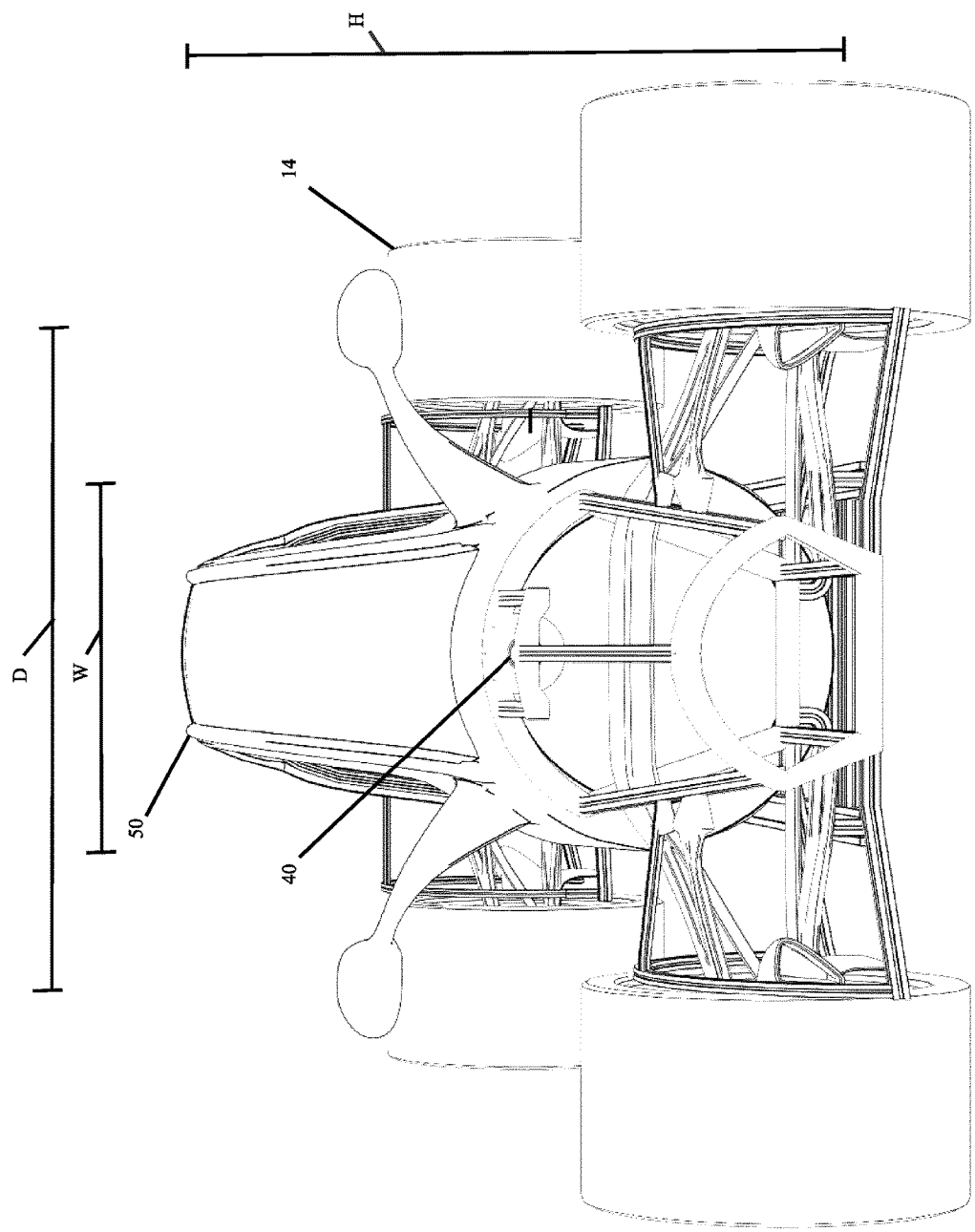
FIG. 5 is a front view of the vehicle shown in FIG. 1.
Figure 9:
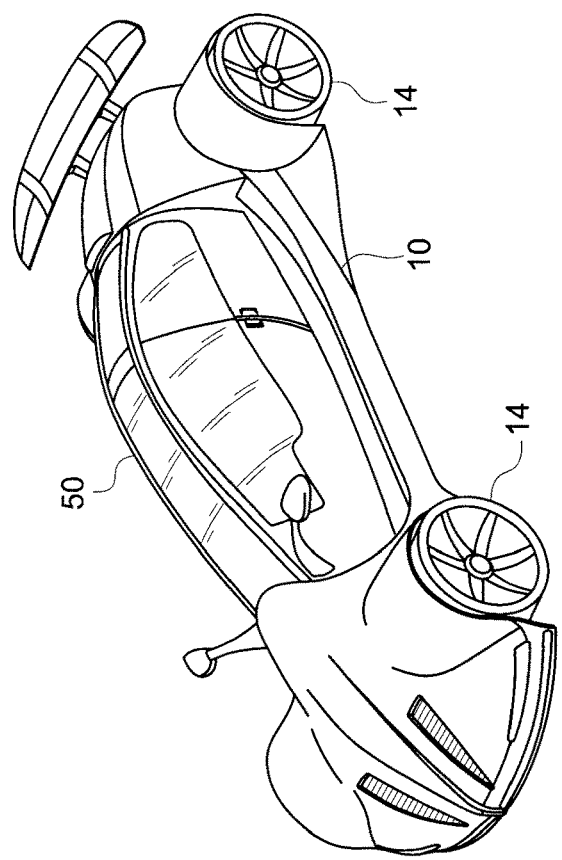
FIG. 9 is a perspective view of the vehicle of FIG. 8.
Figure 8:
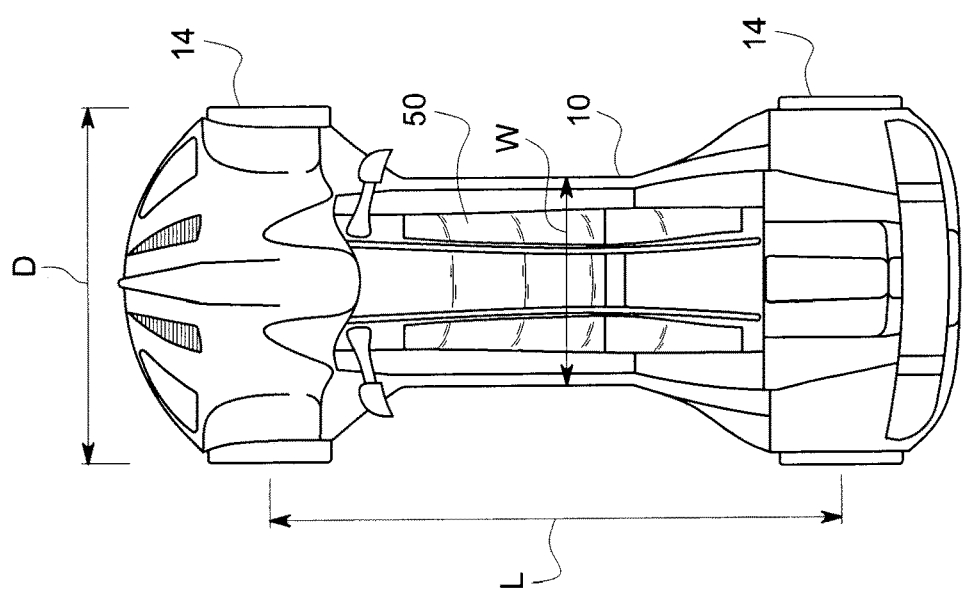
FIG. 8 is a top view of a vehicle, in accordance with another illustrative embodiment of the present invention.

Referring to FIGS. 5, 8 and 9, the cabin 50 may have a uniform cabin width W that is substantially smaller than the track width D at the level of the wheels 14. For example, the cabin width W as a percentage of the track width D can range between 30% to 60%, and preferably 40%. For example, if the track width D is about 70 inches (1.75 meter) then the cabin width W be about 28 inches (0.7 m). The relatively smaller cabin width W with respect to the track width D allows the cabin 50 to pivot within the width of the track D for a given cabin height H.

Referring back to FIGS. 5 and 8, the vehicle 10 in the illustrated example has a wheelbase length L taken from the axis of the back wheels 14 to the front wheels 14 that is of about 120 inches (3 meters). The cabin height H is of about 40 inches (1 m) and the cabin width W is of about 30 inches (0.75 m). The length of the cabin is of about 92 inches (2.3 m) and may accommodate two riders sitting one in front of the other. The total width of the vehicle 10 at the wheel level is of about 76 inches (1.9 m) and the total length of the vehicle is about 180 inches (4.5 m). Of course, all the above width and length values are illustrative and may vary as person skilled in the art will understand.

The vehicle 10 may be provided with other standard features found in regular cars such as security air bags, heating systems, cruise control, air conditioning, opening roof, braking systems, anti-lock systems (ABS), etc.

As can be appreciated, a preferred advantage of the present invention is that it provides a vehicle that combines the characteristics of motorcycles, in terms of handling, with the stability of three or four-wheeled vehicles by means of a pivoting cabin which rotates along a longitudinal axis above both the seating assembly of the cabin and the center of gravity of the cabin, thus achieving a more comfortable and stable ride with natural movements as compared with existing hybrid vehicles.

Another preferred advantage of the present invention is that it provides a vehicle that combines the characteristics of motorcycles, in terms of handling, with the stability and safety of regular car by means of a pivoting cabin which rotates along a longitudinal axis above both the seating assembly of the cabin and the center of gravity of the cabin.

The scope of the claims should not be limited by the preferred embodiments set forth in the examples, but should be given the broadest interpretation consistent with the description as a whole

The invention claimed is:

1. A vehicle (10) comprising:
   a base frame (12) having three or more wheels (14);
   a steering system (20) for steering one or more of the wheels (14);
   a propulsion system (30) for driving at least one of the wheels (14);
   a front pivot member (40) and a back pivot member (42) longitudinally spaced apart from one another on the base frame (12);
   a cabin (50) having a front pivot point (60) and a back pivot point (62), the cabin (50) being pivotally mounted to the base frame (12) between the front pivot member (40) and the back pivot member (42), the front and back pivot points (60, 62) defining a longitudinal rotational axis (P) of the cabin (50) that is substantially horizontal and above a horizontal axis defined by a center of gravity (C) of the cabin (50), the cabin (50) being rotatable around the longitudinal rotational axis (P) in one of a clockwise or a counterclockwise direction; and
   a seat assembly (70) in the cabin (50) for sitting one or more users, the seat assembly (70) being located below the longitudinal rotational axis (P) of the cabin (50).

2. The vehicle of claim 1, wherein the cabin (50) is pivotally mounted to freely rotate with respect to the front and back pivot members (40, 42) of the base frame (12).

3. The vehicle of claim 1, wherein the base frame (12) comprises two front wheels and two back wheels.

4. The vehicle of claim 1, comprising a suspension system (44, 46) coupled to the base frame (12) and an axle assembly of the wheels (14).

5. The vehicle of claim 1, wherein the propulsion system (30) comprises a combustion motor or an electric motor or a wheel-mounted electrically motorized wheel assembly in one or more of the wheels (14).

6. The vehicle of claim 1, wherein the steering system (20) comprises an electronic steering portion in the cabin (50) and an electronic component mounted on the base frame (12) for steering one or more of the wheels (14), the electronic steering component on the frame (12) being operatively connected to the steering portion in the cabin (50).

7. The vehicle of claim 3, wherein the propulsion system (30) comprises a rear compartment on the base frame (12) located adjacent to the two back wheels for receiving a combustion motor or an electric motor for driving one or more of the wheels (14).

8. The vehicle of claim 3, wherein the base frame (12) comprises a front compartment located adjacent to the two front wheels for providing storage space or for receiving a combustion motor or an electric motor for driving one or more of the wheels (14).

9. The vehicle of claim 1, wherein the cabin (50) and seat assembly (70) are shaped and sized to receive one or more riders.

10. The vehicle of claim 3, wherein the cabin (50) has a cabin width (W) that is of 30% to 60% of a track width (D) defined between opposite front wheels and back wheels (14), the cabin (50) being pivotable within the track width (D) for a given height (H).

11. A vehicle (10) comprising:
    a base frame (12) having three or more wheels (14);
    a steering system (20) for steering one or more of the wheels (14);
    a propulsion system (30) for driving at least one of the wheels (14);
    a front pivot member (40) and a back pivot member (42) longitudinally spaced apart from one another on the base frame (12);
    a cabin (50) having a front pivot point (60) and a back pivot point (62), the cabin (50) being pivotally mounted to the base frame (12) between the front pivot member (40) and the back pivot member (42), the front and back pivot points (60, 62) defining a longitudinal rotational axis (P) of the cabin (50) that is substantially horizontal and above a horizontal axis defined by a center of gravity (C) of the cabin (50), the cabin (50) being rotatable around the longitudinal rotational axis (P) in one of a clockwise or a counterclockwise direction; and
    a seat assembly (70) in the cabin (50) for sitting one or more users, the seat assembly (70) being located below the longitudinal rotational axis (P) of the cabin (50);
    wherein the cabin (50) is pivotally mounted to freely rotate with respect to the front and back pivot members (40, 42) of the base frame (12).

12. The vehicle of claim 11, wherein the base frame (12) comprises two front wheels and two back wheels.

13. The vehicle of claim 11, comprising a suspension system (44, 46) coupled to the base frame (12) and an axle assembly of the wheels (14).

14. The vehicle of claim 11, wherein the propulsion system (30) comprises a combustion motor or an electric motor or a wheel-mounted electrically motorized wheel assembly in one or more of the wheels (14).

15. The vehicle of claim 11, wherein the steering system (20) comprises an electronic steering portion in the cabin (50) and electronic steering component mounted on the base frame (12) for steering one or more of the wheels (14), the electronic steering component on the frame (12) being operatively connected to the steering portion in the cabin (50).

16. The vehicle of claim 12, wherein the cabin (50) has a cabin width (W) that is of 30% to 60% of a track width (D) defined between opposite front wheels and back wheels (14), the cabin (50) being pivotable within the track width (D) for a given height (H).

17. The vehicle of claim 11, wherein the cabin (50) and seat assembly (70) are shaped and sized to receive one or more riders sitting one front of the other.

18. A vehicle (10) comprising:
a base frame (12) having three or more ground engaging devices (14);
a steering system (20) for steering one or more of the ground engaging devices (14);
a propulsion system (30) for driving at least one of the ground engaging devices (14);
a front pivot member (40) and a back pivot member (42) longitudinally spaced apart from one another on the base frame (12);
a cabin (50) having a front pivot point (60) and a back pivot point (62), the cabin (50) being pivotally mounted to the base frame (12) between the front pivot member (40) and the back pivot member (42), the front and back pivot points (60, 62) defining a longitudinal rotational axis (P) of the cabin (50) that is substantially horizontal and above a horizontal axis defined by a center of gravity (C) of the cabin (50), the cabin (50) being rotatable around the longitudinal rotational axis (P) in one of a clockwise or a counterclockwise direction; and
a seat assembly (70) in the cabin (50) for sitting one or more users, the seat assembly (70) being located below the longitudinal rotational axis (P) of the cabin (50).

19. The vehicle of claim 18, wherein the cabin (50) is pivotally mounted to freely rotate with respect to the front and back pivot members (40, 42) of the base frame (12).

20. The vehicle of claim 18, wherein the base frame (12) comprises two front wheels and two back wheels, and wherein the cabin (50) has a cabin width (W) that is of 30% to 60% of a track width (D) defined between opposite front wheels and back wheels (14), the cabin (50) being pivotable within the track width (D) for a given height (H).

21. The vehicle of claim 1, comprising a control system for limiting the angular rotation or speed or acceleration of the rotation of the cabin (50).

22. The vehicle of claim 18, comprising a control system for limiting the angular rotation or speed or acceleration of the rotation of the cabin (50).

* * * * *